(12) United States Patent
Mou et al.

(10) Patent No.: US 12,265,247 B2
(45) Date of Patent: Apr. 1, 2025

(54) EDGE-LIT LIGHT PANEL

(71) Applicant: RENSSELAER POLYTECHNIC INSTITUTE, Troy, NY (US)

(72) Inventors: Xi Mou, Santa Clara, CA (US);
Nadarajah Narendran, Clifton Park, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 154 days.

(21) Appl. No.: 17/610,179

(22) PCT Filed: May 11, 2020

(86) PCT No.: PCT/US2020/032301
§ 371 (c)(1),
(2) Date: Nov. 10, 2021

(87) PCT Pub. No.: WO2020/231900
PCT Pub. Date: Nov. 19, 2020

(65) Prior Publication Data
US 2022/0229221 A1    Jul. 21, 2022

Related U.S. Application Data

(60) Provisional application No. 63/021,716, filed on May 8, 2020, provisional application No. 62/846,221, filed on May 10, 2019.

(51) Int. Cl.
*F21V 8/00* (2006.01)

(52) U.S. Cl.
CPC ........... *G02B 6/002* (2013.01); *G02B 6/0036* (2013.01); *G02B 6/0038* (2013.01);
(Continued)

(58) Field of Classification Search
CPC .... G02B 6/002; G02B 6/0036; G02B 6/0038; G02B 6/0043; G02B 6/0076; G02B 6/0078; G02B 6/009; G02B 6/0091
See application file for complete search history.

(56) References Cited

U.S. PATENT DOCUMENTS 6,576,887 B2    6/2003  Whitney et al.
6,619,175 B2    9/2003  Yoo
(Continued)

FOREIGN PATENT DOCUMENTS

| EP | 1657694 A1 | 5/2006 |
|---|---|---|
| TW | M526038 U * | 7/2016 |
| WO | 2018228905 A1 | 12/2018 |

OTHER PUBLICATIONS

English Machine Translation of TW M526038 U (Year: 2016).*
(Continued)

*Primary Examiner* — Keith G. Delahoussaye
(74) *Attorney, Agent, or Firm* — Barclay Damon LLP; Anthony P. Gangemi

(57) ABSTRACT

In an embodiment, there is provided a light guide for an edge-lit light panel. The light guide includes a first light coupling surface; a second light coupling surface; a first light output surface; and a second light output surface. The second light coupling surface opposes the first light coupling surface. The second light output surface opposes the first light output surface. The first light output surface and the second light output surface are coupled between the first light coupling surface and the second light coupling surface. Each light coupling surface is configured to receive incident light from a respective light source and to produce at least a portion of a batwing light beam inside the light guide. The at least a portion of the batwing light beam is concentrated (Continued)

adjacent the first light output surface, the first light output surface corresponding to a first light extraction surface.

17 Claims, 3 Drawing Sheets

(52) U.S. Cl.
CPC ......... *G02B 6/0051* (2013.01); *G02B 6/0063* (2013.01); *G02B 6/0068* (2013.01); *G02B 6/0078* (2013.01)

(56) References Cited

U.S. PATENT DOCUMENTS

| | | |
|---|---|---|
| 7,252,427 B2 | 8/2007 | Teng et al. |
| 7,325,958 B2 | 2/2008 | Yang et al. |
| 7,448,788 B2 | 11/2008 | Chen et al. |
| 7,513,670 B2 | 4/2009 | Yang et al. |
| 7,607,816 B2 | 10/2009 | Li |
| 8,075,157 B2 | 12/2011 | Zhang et al. |
| 8,264,622 B2 | 9/2012 | Gourlay |
| 9,028,124 B2 | 5/2015 | Tseng |
| 9,268,082 B2 | 2/2016 | Van Dijk et al. |
| 9,599,297 B2 | 3/2017 | Stephens |
| 9,612,390 B2 | 4/2017 | Thompson et al. |
| 9,625,636 B2 | 4/2017 | Durkee et al. |
| 9,645,303 B2 | 5/2017 | Tarsa et al. |
| 9,891,372 B2 | 2/2018 | Chen et al. |
| 9,952,372 B2 | 4/2018 | Wilcox et al. |
| 2007/0064444 A1* | 3/2007 | Kim ................... G02B 6/0031 362/613 |
| 2008/0285274 A1 | 11/2008 | Jung |
| 2010/0195024 A1* | 8/2010 | Yoo .................... G09G 3/3406 315/297 |
| 2010/0321953 A1* | 12/2010 | Coleman ................ F21S 8/06 362/613 |
| 2011/0242837 A1 | 10/2011 | Cornelissen et al. |
| 2012/0093460 A1 | 4/2012 | Onac et al. |
| 2012/0113676 A1* | 5/2012 | Van Dijk ............ G02B 6/0078 362/606 |
| 2015/0029750 A1 | 1/2015 | Wang He |
| 2015/0138779 A1 | 5/2015 | Livesay et al. |
| 2015/0316703 A1 | 11/2015 | De Sugny et al. |
| 2018/0246270 A1 | 8/2018 | Di Trapani et al. |

OTHER PUBLICATIONS

International Search Report and the Written Opinion of the International Searching Authority, International Application No. PCT/US2020/032301, mailed Aug. 24, 2020.

* cited by examiner

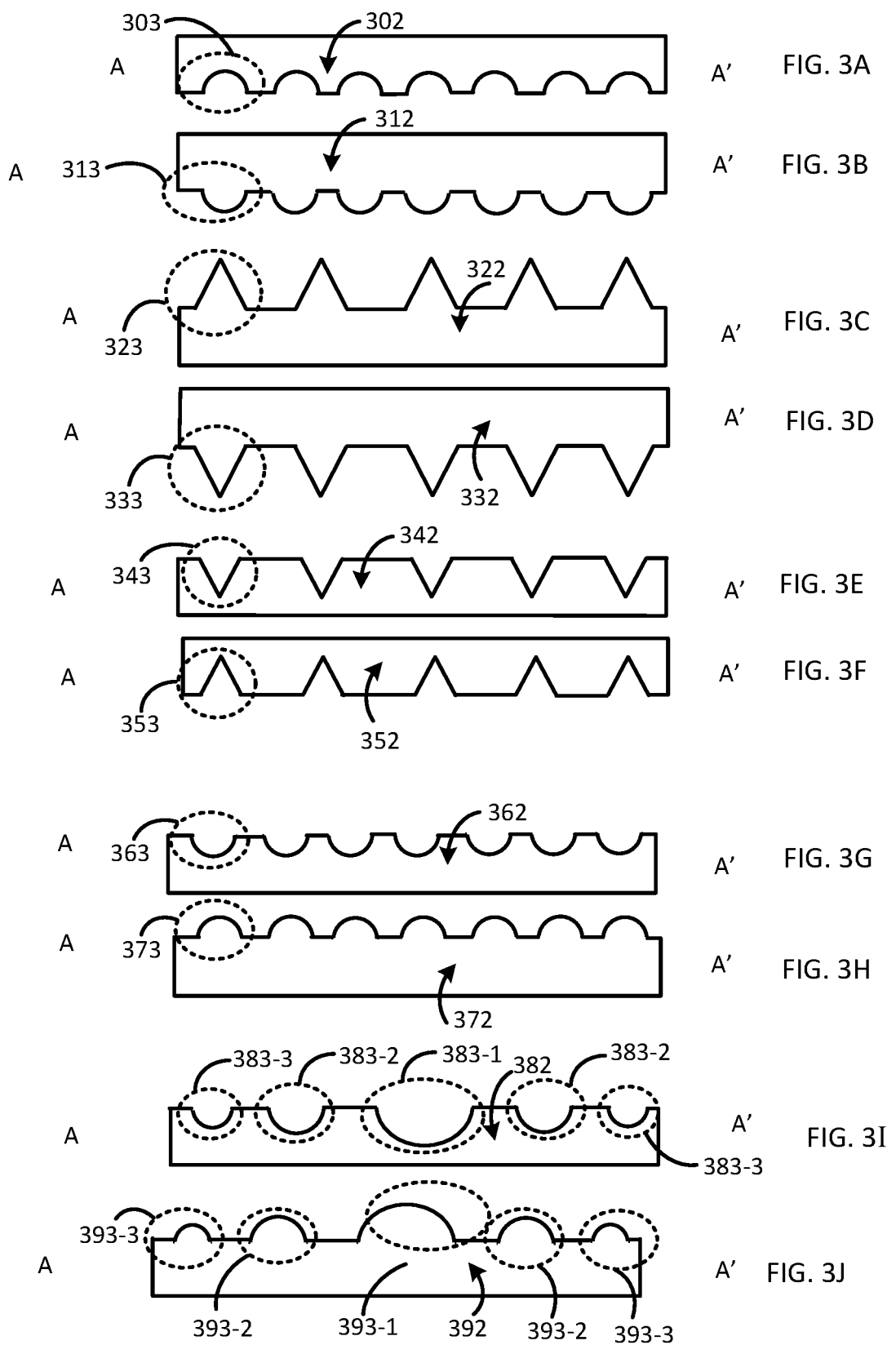

EDGE-LIT LIGHT PANEL

CROSS REFERENCE TO RELATED APPLICATION(S)

This application claims the benefit of U.S. Provisional Application No. 62/846,221, filed May 10, 2019, and U.S. Provisional Application No. 63/021,716, filed May 8, 2020, which are incorporated by reference as if disclosed herein in their entireties.

FIELD

The present disclosure relates to a light panel, in particular to, an edge-lit light panel.

BACKGROUND

Back-lit light panels work by placing light sources (e.g., light emitting diodes (LEDs)) at the back of the panel. The light panel is configured to project light forward across the full expanse of the light panel from the front. The thickness of back-lit light panels includes the light sources, the panel and a distance between the light sources and the panel. The distance between the light sources and the panel is configured to enable an overall uniform and bright illumination of the entire lamp. In order to achieve an even light distribution, the back-lit panel light may typically have a thickness of about 30 mm in a direction perpendicular to the light panel.

For edge-lit light panels, the light sources are positioned at the side (i.e., edge) of the panel with light beaming into a light transmitting/guiding medium that re-directs the light to the viewing/extraction surface. Edge-lit LED panel lights are generally thinner than the back-lit lights because the LEDs used in them are placed at the edge of the panel and rather than at the back. However, edge-lit light panels may use relatively more energy compared to back-lit light panels for a same light intensity output. Such relative energy inefficiency may occur when transmitted light is lost between a light source and the panel (light coupling loss) or lost within the panel itself (light extraction loss).

SUMMARY

In some embodiments, there is provided a light guide for an edge-lit light panel. The light guide includes a first light coupling surface; a second light coupling surface opposing the first light coupling surface; a first light output surface; and a second light output surface opposing the first light output surface. The first light output surface and the second light output surface are coupled between the first light coupling surface and the second light coupling surface. Each light coupling surface is configured to receive incident light from a respective light source and to produce at least a portion of a batwing light beam inside the light guide. The at least a portion of the batwing light beam is concentrated adjacent the first light output surface. The first light output surface corresponds to a first light extraction surface.

In some embodiments of the light guide, each light coupling surface includes at least one leg of a V groove.

In some embodiments of the light guide, the first light extraction surface includes a light extraction feature selected from the group comprising prismatic, spherical, cylindrical, conical and asymmetric.

In some embodiments of the light guide, the first light extraction surface comprises a plurality of prismatic features having a separation, S, pitch, P and angle, $\mu$.

In some embodiments of the light guide, each light coupling surface corresponds to a V groove and each V groove has an angle $\omega$ with a maximum value of arctan (L/H), where L corresponds to a length of the light guide and H corresponds to a height of the light guide.

In some embodiments of the light guide, the second light output surface corresponds to a second light extraction surface and each coupling surface is configured to produce a batwing light beam inside the light guide. In some embodiments of the light guide, the second light output surface corresponds to a reflective surface.

In some embodiments, there is provided an edge-lit light panel. The edge-lit light panel includes a plurality of light guides; and a plurality of light sources. Each light guide includes a first light coupling surface positioned relative to a first edge of the edge-lit light panel, a second light coupling surface opposing the first light coupling surface and positioned relative to a second edge of the edge-lit light panel. The second edge opposes the first edge. Each light guide further includes a first light output surface, and a second light output surface opposing the first light output surface. The first light output surface and the second light output surface are coupled between the first light coupling surface and the second light coupling surface. Each light coupling surface is configured to receive incident light from a respective light source and to produce at least a portion of a batwing light beam inside the light guide. The at least a portion of the batwing light beam is concentrated adjacent the first light output surface. The first light output surface corresponds to a first light extraction surface.

In some embodiments, the edge-lit light panel further includes a plurality of light source reflectors. Each light source reflector is positioned relative to a respective light source and is configured to reflect the emitted light from the light source onto the corresponding coupling surface of the light guide.

In some embodiments, the edge-lit light panel further includes a diffuse reflector positioned relative to the first light output surface or the second light output surface.

In some embodiments of the edge-lit light panel, each light coupling surface includes at least one leg of a V groove.

In some embodiments of the edge-lit light panel, the first light extraction surface includes a light extraction feature selected from the group comprising prismatic, spherical, cylindrical, conical and asymmetric.

In some embodiments of the edge-lit light panel, the first light extraction surface comprises a plurality of prismatic features having a separation, S, pitch, P and angle, $\mu$.

In some embodiments of the edge-lit light panel, the second light output surface corresponds to a second light extraction surface and each coupling surface is configured to produce a batwing light beam inside the light guide.

In some embodiments of the edge-lit light panel, each of the plurality of light sources is a light emitting diode (LED).

In some embodiments, there is provided a lighting system. The lighting system includes a light source controller; an edge-lit light panel; and a plurality of light source drivers. The edge-lit light panel includes a plurality of light guides, and a plurality of light sources. Each light source driver is configured to drive a respective light source based, at least in part, on a signal from the light source controller. Each light guide includes a first light coupling surface positioned relative to a first edge of the edge-lit light panel, and a second light coupling surface opposing the first light coupling surface and positioned relative to a second edge of the edge-lit light panel. The second edge opposes the first edge. Each light guide further includes a first light output surface, and a second light output surface opposing the first light output surface. The first light output surface and the second light output surface are coupled between the first light coupling surface and the second light coupling surface. Each light coupling surface is configured to receive incident light from a respective light source and to produce at least a portion of a batwing light beam inside the light guide. The at least a portion of the batwing light beam concentrated adjacent the first light output surface, the first light output surface corresponding to a first light extraction surface.

In some embodiments of the lighting system, the edge-lit light panel further includes a diffuse reflector positioned relative to the first light output surface or the second light output surface.

In some embodiments of the lighting system, each light coupling surface includes at least one leg of a V groove.

In some embodiments of the lighting system, the first light extraction surface includes a light extraction feature selected from the group comprising prismatic, spherical, cylindrical, conical and asymmetric.

In some embodiments of the lighting system, each of the plurality of light sources is a light emitting diode (LED).

BRIEF DESCRIPTION OF THE DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein:

FIGS. 3A through 3J are sketches of cross sections of various example first light output surfaces, illustrating various light extraction feature geometries.

DETAILED DESCRIPTION

Figure 1A:
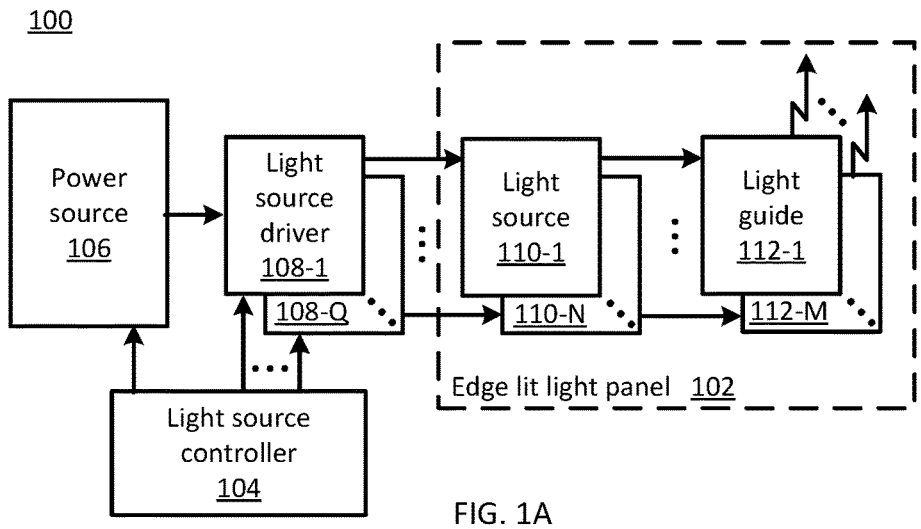
FIG. 1A is a functional block diagram of a lighting system including an edge-lit light panel, consistent with several embodiments of the present disclosure.

Generally, this disclosure relates to an edge-lit light panel. The edge-lit light panel is configured to provide relatively efficient light coupling between a light source and a corresponding light guide and relatively efficient light extraction between the light guide and a light output. In one example, the edge-lit light panel may be used in a display (e.g., backlit). In another example, the edge-lit light panel may correspond to or be utilized in a lighting luminaire. The light source and light guide are configured to produce at least a portion of a batwing shaped light beam within the light guide with the light intensity concentrated at or near at least one light output surface. In other words, a light source and a light guide consistent with the present disclosure may be configured to provide relatively higher flux density and illuminance uniformity at a light output surface (i.e., a light extraction surface) and may thus provide improved extraction efficiency and panel luminance uniformity. A light extraction surface may include at least one light extraction feature configured to facilitate light extraction efficiency and/or creation of an output beam shape.

The edge-lit light panel includes a plurality of light guides and a plurality of light sources positioned along an edge of the edge-lit light panel. Each light guide has a first end and an opposing second end with each end corresponding to a respective light coupling surface. Each light guide may have a generally rectangular (e.g., square) cross section oriented generally perpendicular to a line drawn between the first and second ends. Thus, each light guide may have four generally perpendicular sides coupled between the first end and the second end. A first side and an opposing second side correspond to respective light output surfaces. At least one light output surface corresponds to a light extraction surface configured to emit light. A third side and an opposing fourth side may be configured to couple (e.g., touch) to adjacent light guides or a side of the edge-lit light panel.

In an embodiment, there is provided a light guide for an edge-lit light panel. The light guide includes a first light coupling surface; a second light coupling surface; a first light output surface; and a second light output surface. The second light coupling surface opposes the first light coupling surface. The second light output surface opposes the first light output surface. The first light output surface and the second light output surface are coupled between the first light coupling surface and the second light coupling surface. Each light coupling surface is configured to receive incident light from a respective light source. In one example, the light coupling surface may be configured receive a Lambertian light beam and to produce at least a portion of a batwing light beam inside the light guide. In another example, the light source may include or be coupled to secondary optics configured to produce at least a portion of a batwing light beam inside the light guide. The at least a portion of a batwing light beam is concentrated adjacent the first light output surface. The batwing light beam is configured to facilitate light extraction efficiency.

Luminaire (e.g., edge-lit light panel) efficiency ($\eta_{luminaire}$) corresponds to a ratio of light output (i.e., luminous flux, $\varphi$) from the light guide to light output from the source, i.e., $\eta_{luminaire}=\varphi_{out}/\varphi_{src}$. Luminaire efficiency is related to light coupling efficiency ($\eta_{LC}$) and light extraction efficiency ($\eta_{LE}$). Light coupling efficiency corresponds to a ratio of luminous flux ($\varphi_{in}$) in the light guide to luminous flux ($\varphi_{src}$) emitted from the light source ($\eta_{LC}=\varphi_{in}/\varphi_{src}$). Light extraction efficiency, $\eta_{LE}$, is a ratio of luminous flux ($\varphi_{out}$) output from the light guide to the luminous flux in the light guide ($\eta_{LE}=\varphi_{out}/\varphi_{in}$). Thus, luminaire efficiency corresponds to a product of the light coupling efficiency and light extraction efficiency.

It may be appreciated that a relatively higher flux density (i.e., concentration) relatively close to a light output surface may improve extraction efficiency. A batwing shaped input beam may have a relatively higher percentage of light concentrated at a light output surface compared to, for example, a Lambertian input beam. A batwing input beam may have a better illuminance uniformity along the light guide compared to the Lambertian input beam. In an embodiment, a V groove shaped coupling surface that receives an Lambertian source beam is configured to produce a batwing shaped light beam within the light guide. For a rectangular light guide having opposing extraction surfaces, the V groove may be defined by an angle, ω, between a leg of the V groove and a line perpendicular to the extraction surfaces. As the angle, ω, is increased towards its limit, $ω_{max}$=arctan L/H, where L is a length and H is a height of the light guide, the total light redirected efficiency may increase. In another embodiment, a coupling surface corresponding to one leg of a V groove (i.e., a wedge-shaped coupling surface) may be configured to produce a portion of a batwing shaped light beam within a light guide adjacent an output surface.

Light extraction efficiency may be facilitated through a light extraction feature of at least one light output surface of a light guide. The light extraction feature may be further configured to provide a selected extracted beam pattern (e.g., batwing). In an embodiment, the light extraction feature may be geometric and may be configured to provide total internal reflection over a portion of the light extraction surface.

FIG. 1A is a functional block diagram 100 of a lighting system including an edge-lit light panel 102, consistent with several embodiments of the present disclosure. Lighting system 100 includes the edge-lit light panel 102, a light source controller 104, a power source 106, and a plurality of light source drivers 108-1, . . . 108-Q. Edge-lit light panel 102 includes a plurality of light sources 110-1, . . . 110-N. Edge-lit light panel 102 further includes a plurality of light guides 112-1, . . . , 112-M. In one nonlimiting example, a number of light sources 110-1, . . . 110-N may be twice a number of light guides 112-1, . . . , 112-M.

Power source 106 is configured to provide power to the plurality of light source drivers 108-1, . . . , 108-Q, under control of light source controller 104. Light source controller 104 may be further configured to control the plurality of light source drivers 108-1, . . . , 108-Q, and to thus control power to light sources 110-1, . . . , 110-M. Power source 106 may include, but is not limited to, a power supply, a battery, a DC to DC converter, etc. Light source controller 104 may include, but is not limited to, a microcontroller, an application specific integrated circuit (ASIC), a field programmable gate array (FPGA), a programmable logic device (PLD), etc. Light source drivers 108-1, . . . , 108-Q may include, but are not limited to, switches, transistors, diodes, etc. Light sources 110-1, . . . , 110-M may include, but are not limited to, light emitting diodes (LEDs), incandescent bulbs, fluorescent bulbs, etc.

Thus, edge-lit light panel 102 may be configured to receive power from the power source 106 via light source drivers 108-1, . . . , 108-Q under the control of light source controller 104. Edge-lit light panel 102 may then be configured to provide illumination. A light output of the edge-lit light panel 102 is related to features of light guides 112-1, . . . , 112-M, as will be described in more detail below.

Figure 1B:
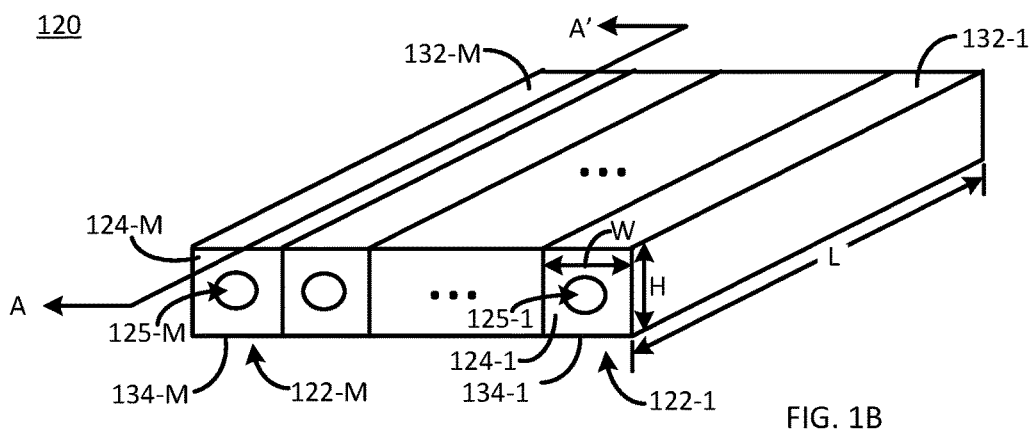
FIG. 1B is a sketch of an edge-lit light panel, consistent with several embodiments of the present disclosure.

FIG. 1B is a sketch of an edge-lit light panel 120, consistent with several embodiments of the present disclosure. Edge-lit light panel 120 is one example of edge-lit light panel 102 of FIG. 1A. Edge-lit light panel 120 includes a plurality of light guides 122-1, . . . , 122-M and a plurality of light sources 125-1, . . . , 125-M. The light guides are formed of a transparent material. In one nonlimiting example, the light guides may be formed of PMMA (poly (methyl methacrylate)). However, this disclosure is not limited in this regard. The plurality of light guides 122-1, . . . , 122-M are positioned adjacent each other to form the edge-lit light panel 120. Each light guide, e.g., light guide 122-1 has a height, H, a width, W, and a length, L. Thus, the edge-lit light panel 120 that may include a number, M, light guides, has an overall width of M*W, a height, H, and a length, L. The edge-lit light panel 120 may have a generally rectangular shape.

Each light guide 122-1, . . . , 122-M has a respective first light output surface 132-1, . . . , 132-M and an opposing respective second light output surface 134-1, . . . , 134-M. The plurality of first light output surfaces 132-1, . . . , 132-M together may form a first light output surface of the edge-lit light panel 120. Each light output surface 132-1, . . . , 132-M may then correspond to a light extraction surface. Each light guide 122-1, . . . , 122-M has a respective first coupling surface 124-1, . . . , 124-M. Each light source 125-1, . . . , 125-M is positioned relative to a respective first coupling surface 124-1, . . . , 124-M. Each coupling surface 124-1, . . . , 124-M is configured to receive incident light from its respective light source 125-1, . . . , 125-M, and is configured to produce at least a portion of a batwing light beam within the respective light guide 122-1, . . . , 122-M. Each at least a portion of a batwing may be positioned adjacent each respective light output surface 132-1, . . . , 132-M.

Figure 1C:
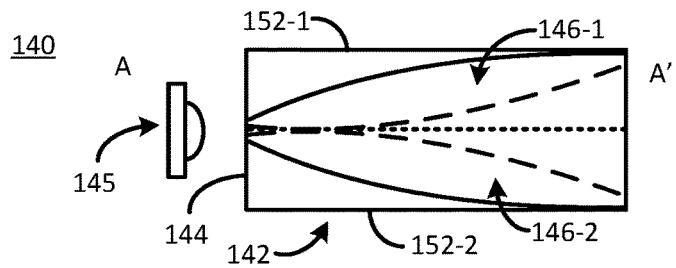
FIG. 1C is a sketch illustrating a batwing shaped light beam in a light guide, consistent with several embodiments of the present disclosure.

FIG. 1C is a sketch 140 illustrating a batwing shaped light beam in a light guide, consistent with several embodiments of the present disclosure. Sketch 140 corresponds to cross section A-A' of FIG. 1B and includes a light guide 142 and a light source 145. Light guide 142 includes a first coupling surface 144 configured to receive incident light from the light source 145. Light guide 142 further includes a first light output surface 152-1 and a second light output surface 152-2, opposing the first light output surface 152-1. Sketch 140 further includes a cross section of a batwing shaped light beam having a first portion 146-1 of the batwing and a second portion 146-2 of the batwing. The first batwing portion 146-1 of the light beam is positioned adjacent the first light output surface 152-1 and the second batwing portion 146-2 of the light beam is positioned adjacent the second light output surface 152-2. Thus, the batwing light beam 146-1, 146-2 in the light guide 142 is concentrated generally near light output surfaces 152-1, 152-2. The light output surfaces 152-1, 152-2 may thus correspond to light extraction surfaces. The batwing light beam 146-1, 146-2 may be formed by a feature of the first coupling surface 144 and/or of the light source 145. The batwing light beam may facilitate luminaire efficiency and uniform illumination.

Figure 1D:
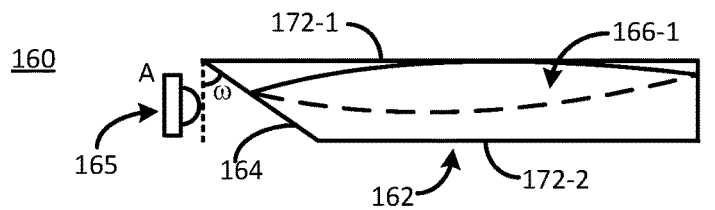
FIG. 1D is a sketch illustrating a wedge shaped coupling surface and a corresponding portion of a batwing light beam in a light guide, consistent with several embodiments of the present disclosure.

FIG. 1D is a sketch 160 illustrating a wedge shaped coupling surface and a corresponding portion of a batwing light beam in a light guide, consistent with several embodiments of the present disclosure. The wedge shaped coupling surface may correspond to one leg of a V groove, as described herein. Sketch 160 corresponds to cross section A-A' of FIG. 1B and includes a light guide 162 and a light source 165. Light guide 162 includes a first coupling surface 164 configured to receive incident light from the light source 165. Light guide 162 further includes a first light output surface 172-1 and a second light output surface 172-2 opposing the first light output surface 172-1. The coupling surface 164 is at an angle, ω, with respect to a normal (i.e. perpendicular line) to the first output surface 172-1. The coupling surface 164 may thus have a wedge shape and may correspond to one leg of a V groove, as described herein. Sketch 160 further includes a cross section of a portion 166-1 of a batwing shaped light beam. The batwing portion 166-1 of the light beam is positioned adjacent the first light output surface 172-1. The batwing light beam portion 166-1 in the light guide 162 is concentrated generally near the first output surface 172-1. Thus, first light output surface 172-1 corresponds to a light extraction surface and may be configured to emit light. The batwing light beam portion 166-1 may be formed by a feature of the first coupling surface 164 and/or of the light source 165. The batwing light beam portion geometry and efficiency may facilitate luminaire efficiency and uniform illumination.

Figure 2A:
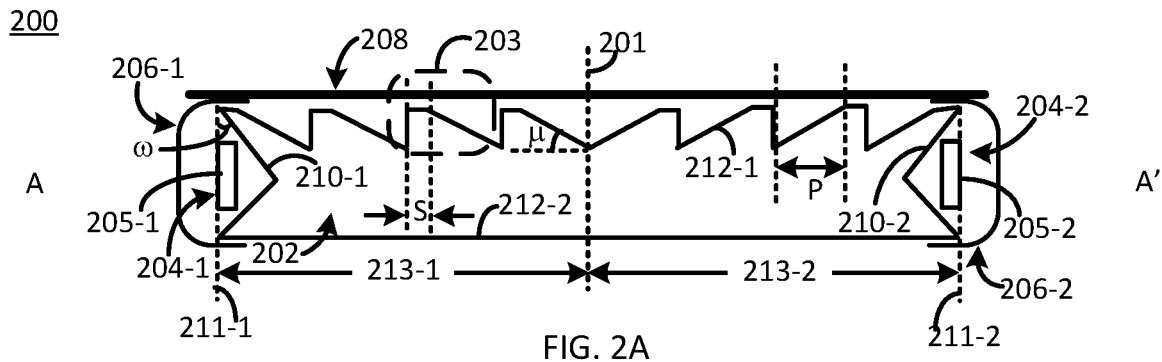
FIGS. 2A through 2D are sketches of cross sections of various example edge-lit light panels corresponding to FIGS. 1A and 1B.

FIGS. 2A through 2D are sketches 200, 220, 240, 260 of cross sections A-A' of various example edge-lit light panels corresponding to the edge-lit light panels of FIGS. 1A and 1B. In FIGS. 2A through 2D, like elements have like reference designators. Turning first to FIG. 2A, example edge-lit light panel 200 includes a light guide 202, two light sources, 204-1, 204-2, and two light source reflectors 206-1, 206-2. In some embodiments, edge-lit light panel 200 may include a diffuse reflector 208. Each light source 204-1, 204-2 has a corresponding emission surface 205-1, 205-2. Each emission surface 205-1, 205-2 faces the respective light source reflector 206-1, 206-2. In other words, each emission surface 205-1, 205-2 faces away from the light guide 202.

Example light guide 202 includes a first light coupling surface 210-1 and a second light coupling surface 210-2 opposing the first light coupling surface 210-1. Light guide 202 further includes a first light output surface 212-1 and a second light output surface 212-2 opposing the first light output surface 212-1. The first light output surface 212-1 and the second light output surface 212-2 are coupled between the first light coupling surface 210-1 and the second light coupling surface 210-2. Each light coupling surface 210-1, 210-2 is configured to receive incident light from a respective light source 204-1, 204-2. Each light coupling surface 210-1, 210-2 is further configured to produce a batwing light beam inside the light guide 202. The batwing light beam may be concentrated adjacent the first light output surface 212-1 and the second light output surface 212-2.

In this example edge-lit light panel 200, each light coupling surface 210-1, 210-2 has a generally V groove shape. For each light coupling surface 210-1, 210-2, an angle of each leg of each V with a respective line 211-1, 211-2 drawn between ends of the V is ω. The lines 211-1, 211-2 may be generally perpendicular to the second output surface 212-2 and may be generally parallel to a surface of each respective light source 204-1, 204-2. Each V groove 210-1, 210-2 is concave with respect to its respective light source 204-1, 204-2.

The first light output surface 212-1 has a plurality of light extraction features, e.g., light extraction feature 203. The first light output surface 212-1 may thus correspond to a light extraction surface configured to emit light. In this example, the light extraction features may be generally prismatic. The light extraction features may include, but are not limited to, prismatic, spherical, cylindrical, conical and asymmetric geometric shapes. The light extraction features may be configured to facilitate capture of photons within the light guide 202, achieve a light extraction efficiency and generate an output beam with a particular shape. In one nonlimiting example, the shape of the output beam may correspond to a batwing. In another example, the plurality of light extraction features may be configured to facilitate total internal reflection over at least a portion of the first light output surface 212-1.

Each light extraction feature 203 may have a spacing of dimension, S, and a pitch of dimension, P. Each portion of the first light output surface 212-1 corresponding to the spacing, S, may be generally parallel to the second light output surface 212-2. Each portion of the first light output surface 212-1 corresponding to the pitch, P, may have a nonzero angle, µ, with respect to a line parallel to the second light output surface 212-2. In an embodiment, the plurality of light extraction features may be configured to provide total internal reflection over at least a portion of the first light output surface 212-1.

The first light output surface 212-1, and thus the light guide 202, may have two regions 213-1 and 213-2. A first region 213-1 may extend from the first coupling surface 210-1 to approximately a centerline 201 of the light guide 202. A second region 213-2 may extend from the centerline 201 to the second coupling surface 210-2. In this example, the light extraction features included in the second region 213-2 may correspond to mirror images of the light extraction features, e.g., light extraction feature 203, included in the first region 213-1. In this example, each region 213-1, 213-2, includes four light extraction features. However, this disclosure is not limited in this regard.

In this example 200, each light source 204-1, 204-2 is configured to emit emitted light from the corresponding emission surface 205-1, 205-2 to respective light source reflectors 206-1, 206-2. The light source reflectors 206-1, 206-2 are configured to reflect received emitted light onto respective coupling surfaces 210-1, 210-2 as incident light. The incident light may be refracted at the coupling surfaces 210-1, 210-2 producing a batwing light beam inside the light guide 202. The batwing light beam may be concentrated adjacent the first light output surface 212-1 and the second light output surface 212-2.

The first light output surface (i.e., light extraction surface) 212-1 is configured to facilitate capture of photons within the light guide 202, achieve a light extraction efficiency and may be configured to generate an output beam with a particular shape. The second light output surface 212-2 may be configured to emit light reflected from the first light output surface 212-1. In some embodiments, the diffuse reflector 208 is configured to scatter light from inside the light guide 202 such that light incident on the second light output surface 212-2 is scattered at a number of angles.

In an embodiment, at least a subset of the light extraction features may be configured for total internal reflection. The subset may include one or more light extraction features that are positioned relatively closer to the centerline 201. In this embodiment, the light extraction features may be configured to facilitate producing a batwing shaped output beam from the light guide 202.

Figure 2B:
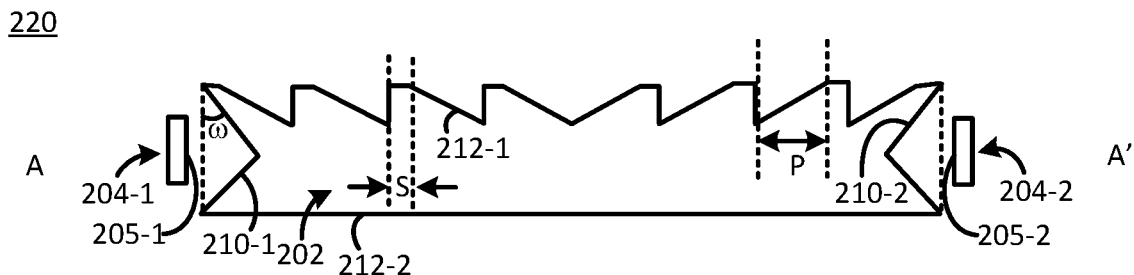

Turning now to FIG. 2B, edge-lit light panel 220 includes the light guide 202 and the plurality of light sources, 204-1, 204-2, as described herein. Each light source 204-1, 204-2 has a corresponding emission surface 205-1, 205-2. In this example 220, each emission surface 205-1, 205-2 faces the light guide 202.

In this example edge-lit light panel 220, each light source 204-1, 204-2 is configured to emit emitted light from the corresponding emission surface 205-1, 205-2 onto respective coupling surfaces 210-1, 210-2 as incident light. The incident light may be refracted at the coupling surfaces 210-1, 210-2 producing a batwing light beam inside the light guide 202. The batwing light beam and may be concentrated adjacent the first light output surface 212-1 and the second light output surface 212-2, as described herein.

Figure 2C:
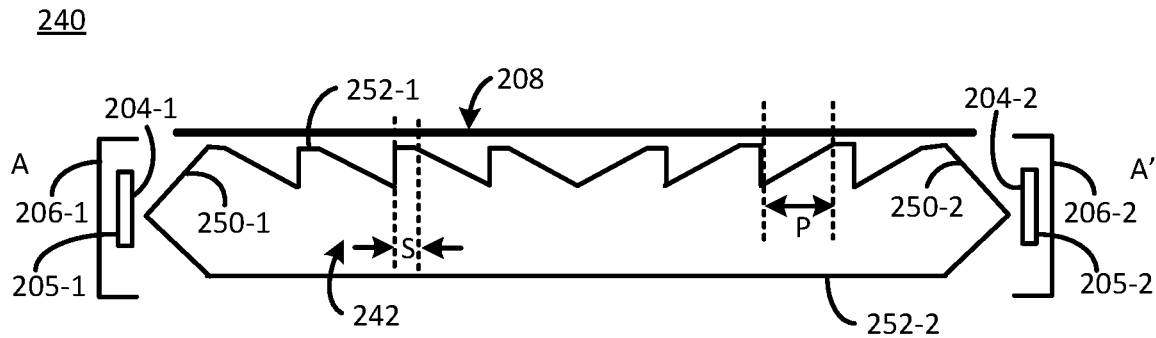

Turning now to FIG. 2C, edge-lit light panel 240 includes a light guide 242, a plurality of light sources, 204-1, 204-2, and a plurality of light source reflectors 206-1, 206-2. In some embodiments, edge-lit light panel 240 may include a diffuse reflector 208. Each light source 204-1, 204-2 has a corresponding emission surface 205-1, 205-2. Each emission surface 205-1, 205-2 faces the respective light source reflector 206-1, 206-2. In other words, each emission surface 205-1, 205-2 faces away from the light guide 202.

Light guide 242 includes a first light coupling surface 250-1 and a second light coupling surface 250-2 opposing the first light coupling surface 250-1. Light guide 242 further includes a first light output surface 252-1 and a second light output surface 252-2 opposing the first light output surface 252-1. The first light output surface 252-1 and the second light output surface 252-2 are coupled between the first light coupling surface 250-1 and the second light coupling surface 250-2. Each light coupling surface 250-1, 250-2 is configured to receive incident light from a respective light source 204-1, 204-2. Each light coupling surface 250-1, 250-2 is further configured to produce a batwing light beam inside the light guide 242. The batwing light beam may be concentrated adjacent the first light output surface 252-1 and the second light output surface 252-2, as described herein.

In this example, each light coupling surface 250-1, 250-2 has a generally V groove shape. An angle of each leg of the V with a vertical line drawn between ends of the V is ω. The vertical line may be generally perpendicular to the second output surface 252-2 and may be generally parallel to a surface of each light source 204-1, 204-2. Each V groove 210-1, 210-2 is convex with respect to its respective light source 204-1, 204-2.

In this example 200, each light source 204-1, 204-2 is configured to emit emitted light from the corresponding emission surface 205-1, 205-2 to respective light source reflectors 206-1, 206-2. The light source reflectors 206-1, 206-2 are configured to reflect received emitted light onto respective coupling surfaces 250-1, 250-2 as incident light. The incident light may be refracted at the coupling surfaces 250-1, 250-2 producing a batwing light beam inside the light guide 242. The batwing light beam and may be concentrated adjacent the first light output surface 252-1 and the second light output surface 252-2.

The first light output surface (i.e., light extraction surface) 252-1 is configured to facilitate capture of photons within the light guide 242, achieve a light extraction efficiency and generate an output beam with a particular shape. The second light output surface 252-2 may be configured to emit light reflected from the first light output surface 252-1. In some embodiments, the diffuse reflector 208 is configured to scatter light from inside the light guide 242 such that light incident on the second light output surface 252-2 is scattered at a number of angles.

Figure 2D:
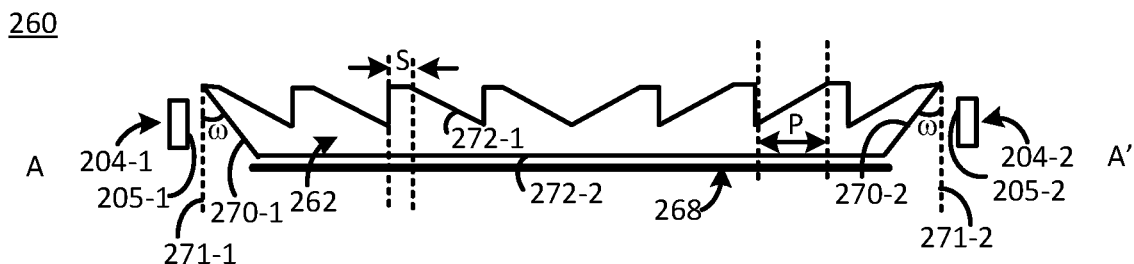

Turning now to FIG. 2D, edge-lit light panel 260 includes a light guide 262 and the plurality of light sources, 204-1, 204-2, as described herein. In some embodiments, edge-lit light panel 260 may include a reflector 268. Each light source 204-1, 204-2 has a corresponding emission surface 205-1, 205-2. In this example 260, each emission surface 205-1, 205-2 faces the light guide 262.

Example light guide 262 includes a first light coupling surface 270 land a second light coupling surface 270-2 opposing the first light coupling surface 270-1. Light guide 262 further includes a first light output surface 272-1 and a second light output surface 272-2 opposing the first light output surface 272-1. The first light output surface 272-1 and the second light output surface 272-2 are coupled between the first light coupling surface 270-1 and the second light coupling surface 270-2. Each light coupling surface 270-1, 270-2 is configured to receive incident light from a respective light source 204-1, 204-2. Each light coupling surface 270-1, 270-2 is further configured to produce a portion of a batwing light beam inside the light guide 262. The batwing light beam portion is configured to be concentrated adjacent the first light output surface 272-1, in this example.

In this example edge-lit light panel 260, each light coupling surface 270-1, 270-2 has a generally wedge shape. The wedge shape may correspond to one leg of a V groove, as described herein. For each light coupling surface 270-1, 270-2, an angle of the wedge (and thus the leg of the V groove) between each light coupling surface 270-1, 270-2 and a respective line 271-1, 271-2 is ω, similar to the V groove, as described herein. The lines 271-1, 271-2 may be generally perpendicular to the second output surface 272-2 and may be generally parallel to a surface of each respective light source 204-1, 204-2.

The light coupling surfaces 270-1, 270-2 of example edge-lit light panel 260 generally correspond to an upper leg of a V groove coupling surface, as described herein. In another example, the light coupling surfaces of an edge-lit light panel may correspond to a lower leg of a V groove, consistent with the present disclosure.

The first light output surface 272-1 has a plurality of light extraction features, as described herein. The first light output surface 272-1 may thus correspond to a light extraction surface configured to emit light. In this example, the light extraction features may be generally prismatic. The light extraction features may include, but are not limited to, prismatic, spherical, cylindrical, conical and asymmetric geometric shapes. The light extraction features may be configured to facilitate capture of photons within the light guide 262, achieve a light extraction efficiency and generate an output beam with a particular shape. In one nonlimiting example, the shape of the output beam may correspond to a batwing. In another example, the plurality of light extraction features may be configured to facilitate total internal reflection over at least a portion of the first light output surface 272-1.

In this example edge-lit light panel 260, each light source 204-1, 204-2 is configured to emit emitted light from the corresponding emission surface 205-1, 205-2 onto respective coupling surface 270-1 as incident light. The incident light may be refracted at the coupling surfaces 270-1, 270-2 producing a portion of a batwing light beam inside the light guide 262. The batwing light beam portion may be concentrated adjacent the first light output surface 272-1.

Example edge-lit light panel 260 may further include a reflector 268. Reflector 268 may be positioned at or near the second light output surface 272-2 and is configured to reflect light out towards the first light output surface 272-1. Reflector 268 may thus be configured to facilitate and/or enhance emission of light from edge-lit light panel 260.

Thus, an edge-lit light panel, consistent with the present disclosure, may include a plurality of light guides and corresponding light sources. Each light source and light guide are configured to produce at least a portion of a batwing shaped light beam within the light guide with the light intensity concentrated at or near at least one light output surface, i.e., at or near at least one light extraction surface. The light source and light guide may be configured to provide relatively higher flux density and illuminance uniformity at a light output surface and may thus provide improved extraction efficiency and panel luminance uniformity. A light extraction surface may include at least one light extraction feature configured to facilitate light extraction efficiency and/or creation of an output beam shape.

FIGS. 3A through 3J are sketches of cross sections of various example first light output surfaces, illustrating various light extraction feature geometries. Each first light output surface corresponds to the first light output surface 132-M and the cross sections correspond to cross section A-A' of FIG. 1B.

FIGS. 3A and 3B are sketches 302, 312 of cross sections of example first light output surfaces including a plurality of generally semicircular extraction features. In these examples 302, 312, the extraction features may be positioned internal to a light guide. Sketch 302 includes a plurality of generally semicircular concave extraction feature geometries, e.g., concave semicircular extraction feature 303. Sketch 312 includes a plurality of generally semicircular convex extraction feature geometries, e.g., convex semicircular extraction feature 313.

FIGS. 3C and 3D are sketches 322, 332 of cross sections of example first light output surfaces including a plurality of generally triangular extraction features. Sketch 322 includes a plurality of generally triangular convex extraction feature geometries, e.g., triangular extraction feature 323. Sketch 332 includes a plurality of generally triangular convex extraction feature geometries, e.g., triangular extraction feature 333.

FIGS. 3E and 3F are sketches 342, 352 of cross sections of example first light output surfaces including a plurality of generally triangular extraction features. Sketch 342 includes a plurality of generally triangular concave extraction feature geometries, e.g., triangular extraction feature 343. Sketch 352 includes a plurality of generally triangular concave extraction feature geometries, e.g., triangular extraction feature 353.

FIGS. 3G and 3H are sketches 362, 372 of cross sections of example first light output surfaces including a plurality of generally semicircular extraction features. In these examples 302, 312, the extraction features may be positioned on an external surface of a light guide. Sketch 362 includes a plurality of generally semicircular concave extraction feature geometries, e.g., concave semicircular extraction feature 363. Sketch 372 includes a plurality of generally semicircular convex extraction feature geometries, e.g., convex semicircular extraction feature 373.

FIGS. 3I and 3J are sketches 382, 392 of cross sections of example first light output surfaces including a plurality of generally semicircular extraction features. In a first example 382, the extraction features may be positioned on an external surface of a light guide. In a second example 392, the extraction features may be positioned internal to a light guide. Sketch 382 includes a plurality of generally semicircular concave extraction feature geometries, e.g., concave semicircular extraction features 383-1, 383-2, 383-3, having varying diameters. Sketch 392 includes a plurality of generally semicircular convex extraction feature geometries, e.g., convex semicircular extraction feature 393-1, 393-2, 393-3, having varying diameters.

Thus, a light output surface, consistent with the present disclosure may include light extraction features having a variety of geometries.

Generally, this disclosure relates to an edge-lit light panel. The edge-lit light panel is configured to provide relatively efficient light coupling between a light source and a corresponding light guide and relatively efficient light extraction between the light guide and a light output. In one example, the edge-lit light panel may be used in a display (e.g., backlit). In another example, the edge-lit light panel may correspond to or be utilized in a lighting luminaire. The light source and light guide are configured to produce at least a portion of a batwing shaped light beam within the light guide with the light intensity concentrated at or near at least one light output surface. A light source and a light guide consistent with the present disclosure may be configured to provide relatively higher flux density and illuminance uniformity at a light output surface (i.e., a light extraction surface) and may thus provide improved extraction efficiency and panel luminance uniformity. A light output surface may include at least one light extraction feature configured to facilitate light extraction efficiency and/or creation of an output beam shape. In one nonlimiting example, an edge-lit light panel, consistent with the present disclosure, may be configured with a light output efficiency of more than 70%.

What is claimed is:

1. A light guide for an edge-lit light panel, the light guide comprising:
    a first light coupling surface;
    a second light coupling surface opposing the first light coupling surface;
    a first light output surface; and
    a second light output surface opposing the first light output surface,
    the first light output surface and the second light output surface coupled between the first light coupling surface and the second light coupling surface, and
    each light coupling surface configured to receive incident light from a respective light source and to produce at least a portion of a batwing light beam inside the light guide, the at least a portion of the batwing light beam concentrated adjacent the first light output surface, the first light output surface corresponding to a first light extraction surface;
    wherein each light coupling surface comprises at least one leg of a V groove.

2. The light guide of claim 1, wherein the first light extraction surface comprises a light extraction feature selected from the group comprising prismatic, spherical, cylindrical, conical and asymmetric.

3. The light guide of claim 1, wherein the first light extraction surface comprises a plurality of prismatic features having a separation, (S), pitch, (P) and angle, (μ).

4. The light guide of claim 1, wherein each light coupling surface corresponds to a V groove and each V groove has an angle (ω) with a maximum value of arctan (L/H), where L corresponds to a length of the light guide and H corresponds to a height of the light guide.

5. The light guide of claim 1, wherein the second light output surface corresponds to a second light extraction surface and each coupling surface is configured to produce a batwing light beam inside the light guide.

6. The light guide of claim 1, wherein the second light output surface corresponds to a reflective surface.

7. An edge-lit light panel comprising:
    a plurality of light guides; and
    a plurality of light sources,
    each light guide comprising a first light coupling surface positioned relative to a first edge of the edge-lit light panel, a second light coupling surface opposing the first light coupling surface and positioned relative to a second edge of the edge-lit light panel, the second edge opposing the first edge, a first light output surface, and a second light output surface opposing the first light output surface, the first light output surface and the second light output surface coupled between the first light coupling surface and the second light coupling surface,
    each light coupling surface configured to receive incident light from a respective light source and to produce at least a portion of a batwing light beam inside the light guide, the at least a portion of the batwing light beam concentrated adjacent the first light output surface, the first light output surface corresponding to a first light extraction surface;

wherein each light coupling surface comprises at least one leg of a V groove.

8. The edge-lit light panel of claim 7, further comprising a plurality of light source reflectors, each light source reflector positioned relative to a respective light source and configured to reflect the emitted light from the light source onto the corresponding coupling surface of the light guide.

9. The edge-lit light panel of claim 7, further comprising a diffuse reflector positioned relative to the first light output surface or the second light output surface.

10. The edge-lit light panel according to claim 7, wherein the first light extraction surface comprises a light extraction feature selected from the group comprising prismatic, spherical, cylindrical, conical and asymmetric.

11. The edge-lit light panel according to claim 7, wherein the first light extraction surface comprises a plurality of prismatic features having a separation, (S), pitch, (P) and angle, (μ).

12. The edge-lit light panel according to claim 7, wherein the second light output surface corresponds to a second light extraction surface and each coupling surface is configured to produce a batwing light beam inside the light guide.

13. The edge-lit light panel according to claim 7, wherein each of the plurality of light sources is a light emitting diode (LED).

14. A lighting system comprising:
a light source controller;
an edge-lit light panel; and
a plurality of light source drivers,
the edge-lit light panel comprising a plurality of light guides, and a plurality of light sources, each light source driver configured to drive a respective light source based, at least in part, on a signal from the light source controller, each light guide comprising a first light coupling surface positioned relative to a first edge of the edge-lit light panel, a second light coupling surface opposing the first light coupling surface and positioned relative to a second edge of the edge-lit light panel, the second edge opposing the first edge, a first light output surface, and a second light output surface opposing the first light output surface, the first light output surface and the second light output surface coupled between the first light coupling surface and the second light coupling surface, each light coupling surface configured to receive incident light from a respective light source and to produce at least a portion of a batwing light beam inside the light guide, the at least a portion of the batwing light beam concentrated adjacent the first light output surface, the first light output surface corresponding to a first light extraction surface;

wherein each light coupling surface comprises at least one leg of a V groove.

15. The lighting system of claim 14, wherein the edge-lit light panel further comprises a diffuse reflector positioned relative to the first light output surface or the second light output surface.

16. The lighting system according to claim 14, wherein the first light extraction surface comprises a light extraction feature selected from the group comprising prismatic, spherical, cylindrical, conical and asymmetric.

17. The lighting system according to claim 14, wherein each of the plurality of light sources is a light emitting diode (LED).

* * * * *